(12) United States Patent
Hairston et al.

(10) Patent No.: US 9,095,203 B2
(45) Date of Patent: Aug. 4, 2015

(54) UNITARY COMPOSITE BACKPACK FRAME WITH UPPER STAYS

(71) Applicant: Kuiu, Inc., Dixon, CA (US)

(72) Inventors: Jason Hairston, Dixon, CA (US); Paul Hewitt, Sacramento, CA (US)

(73) Assignee: KUIU, INC., Dixon, CA (US)

( * ) Notice: Subject to any disclaimer, the term of this patent is extended or adjusted under 35 U.S.C. 154(b) by 0 days.

(21) Appl. No.: 13/856,594

(22) Filed: Apr. 4, 2013

(65) Prior Publication Data

US 2013/0221051 A1    Aug. 29, 2013

Related U.S. Application Data

(63) Continuation-in-part of application No. 13/549,289, filed on Jul. 13, 2012, which is a continuation-in-part of application No. 13/183,767, filed on Jul. 15, 2011, now Pat. No. 8,740,028, and a continuation-in-part of application No. PCT/US2011/044256, filed on Jul. 15, 2011.

(60) Provisional application No. 61/365,097, filed on Jul. 16, 2010, provisional application No. 61/365,097, filed on Jul. 16, 2010.

(51) Int. Cl.
| | |
|---|---|
| *A45F 3/08* | (2006.01) |
| *A45F 3/10* | (2006.01) |
| *B32B 37/14* | (2006.01) |
| *A45C 13/04* | (2006.01) |

(Continued)

(52) U.S. Cl.
CPC . *A45F 3/08* (2013.01); *A45C 13/04* (2013.01); *A45F 3/04* (2013.01); *A45F 3/047* (2013.01); *A45F 3/10* (2013.01); *A45F 3/12* (2013.01); *B32B 37/14* (2013.01); *A45F 2003/045* (2013.01); *A45F 2003/125* (2013.01); *A45F 2003/127* (2013.01)

(58) Field of Classification Search
CPC ........... A45C 13/04; A45F 3/10; A45F 3/047; A45F 3/08
USPC .......... 224/627–636, 259, 261–263, 265, 266
See application file for complete search history.

(56) References Cited

U.S. PATENT DOCUMENTS

| | | | |
|---|---|---|---|
| 3,938,718 A | 2/1976 | Madison | |
| 5,449,102 A * | 9/1995 | Sason | ............................ 224/632 |

(Continued)

FOREIGN PATENT DOCUMENTS

WO    00-74517 A1    12/2000

OTHER PUBLICATIONS

Supplementary European Search Report for Application No. 11807597.7, issued Oct. 30, 2013.

(Continued)

*Primary Examiner* — J. Gregory Pickett
*Assistant Examiner* — Todd Anderson
(74) *Attorney, Agent, or Firm* — PatentBest; Andrew McAleavey

(57) ABSTRACT

Resin-impregnated sandwich composite backpack frames are disclosed. The frames may, for example, be made of a carbon fiber twill with a foam core. The frames have an upper portion that includes upwardly-extending, elongate stays to support a backpack and mechanically decouple its load from the wearer. Open, generally vertically extending tracks in the upper portion provide points of attachment for shoulder strap assemblies. The lower portion is contoured to follow the typical lumbar-sacral curvature of the human back and terminates in a generally U-shaped tongue. Openings and unreinforced areas in the frame are provided to reduce weight and increase flexibility.

18 Claims, 12 Drawing Sheets

(51) Int. Cl.
*A45F 3/04* (2006.01)
*A45F 3/12* (2006.01)

(56) References Cited

U.S. PATENT DOCUMENTS

| | | | |
|---|---|---|---|
| 5,564,612 A | | 10/1996 | Gregory |
| 5,762,243 A | | 6/1998 | McMaster et al. |
| 5,823,414 A | | 10/1998 | Gal |
| 5,890,640 A | | 4/1999 | Thompson |
| 5,954,250 A | * | 9/1999 | Hall et al. ............. 224/262 |
| 5,954,253 A | * | 9/1999 | Swetish ............. 224/631 |
| 5,984,157 A | | 11/1999 | Swetish |
| 6,892,915 B2 | * | 5/2005 | Mares ............. 224/630 |
| 7,287,677 B2 | | 10/2007 | Reid |
| 7,329,457 B2 | * | 2/2008 | Renard et al. ............. 428/297.4 |
| 7,644,847 B2 | | 1/2010 | Howell |
| 8,608,040 B2 | * | 12/2013 | Cheesman et al. ............. 224/629 |
| 2005/0035170 A1 | * | 2/2005 | Sears et al. ............. 224/630 |
| 2005/0255311 A1 | * | 11/2005 | Formella ............. 428/323 |
| 2006/0163305 A1 | | 7/2006 | Tong |
| 2006/0283907 A1 | | 12/2006 | Green et al. |
| 2009/0015022 A1 | | 1/2009 | Rome et al. |
| 2010/0032464 A1 | | 2/2010 | Gleason, Jr. |
| 2010/0282252 A1 | * | 11/2010 | Cheesman et al. ....... 128/202.19 |

OTHER PUBLICATIONS

Mountain Hardwear, Inc., "Radical Thinking: A Backpack That Moves With Your Body, Instead of Against It." Internet. Available at http://www.mountainhardwear.com/exodus.aspx. Last accessed Jun. 16, 2010 and believed to be prior art.
International Search Report and Written Opinion for PCT/US2011/044256, issued Mar. 28, 2012.

* cited by examiner

UNITARY COMPOSITE BACKPACK FRAME WITH UPPER STAYS

CROSS-REFERENCE TO RELATED APPLICATIONS

This application is a continuation-in-part of U.S. patent application Ser. No. 13/549,289, filed Jul. 13, 2012, which is a continuation-in-part of U.S. patent application Ser. No. 13/183,767, and of International Application No. PCT/US2011/044256, both filed on Jul. 15, 2011. Those applications both claim priority to U.S. Provisional Patent Application No. 61/365,097, filed Jul. 16, 2010. The contents of all of those applications are incorporated by reference in their entireties.

BACKGROUND OF THE INVENTION

1. Field of the Invention

The invention relates to frames for backpacks and knapsacks and to methods of making those frames.

2. Description of Related Art

Many backpacks and knapsacks have rigid or semirigid frames that act to suspend the backpack load and distribute it more evenly to the wearer's body. Some frames also allow a user to secure or cinch gear to his or her back more easily than with a backpack alone. Backpack frames may be either internal to the backpack or external to it.

Traditionally, external backpack frames have been made of metal tubes, such as aluminum or steel tubes. These types of frames are simple to construct, as the tubes are simply welded together, but they are typically very heavy, and thus reduce the effective load that a user can carry.

Internal backpack frames are generally made to be lighter, but problems typically arise in making an internal frame that has a useful combination of strength and flexibility. Some degree of flexibility in a backpack frame can help to cushion the user against shifts in the load as he or she walks or runs and to "decouple" the backpack load from the user and his or her movements. However, the problem is multifaceted, because there are some places in a backpack frame where strength and stiffness are warranted in order to properly support the backpack load.

One solution to the stiffness/flexibility problem is to use different materials for different parts of the backpack frame, and some manufacturers have attempted to do so. However, conventional attempts to use many different materials in the same frame often become so complex that they are difficult to manufacture and maintain.

SUMMARY OF THE INVENTION

One aspect of the invention relates to resin impregnated composite backpack frames. The backpack frames are of sandwich construction, with upper and lower layers of a fiber material and a selectively placed reinforcing layer. The frames have an upper portion with upwardly extending, elongate stays that support and decouple the load of the backpack from the wearer. The upper portion also includes a pair of generally vertically oriented open tracks that provide for sliding, positionable attachment of backpack shoulder strap assemblies. The lower portion curves to follow the typical lumbar-sacral curvature of the human back and terminates in a generally U-shaped tongue. Openings and unreinforced areas may be provided in the frame to lighten the frame and provide for selective flexibility.

Frames according to this aspect of the invention may be made by a number of methods, including compression molding.

These and other aspects, features, and advantages of the invention will be set forth in the description that follows.

BRIEF DESCRIPTION OF THE DRAWING FIGURES

The invention will be described with respect to the following drawing figures, in which like numerals represent like views throughout the drawings, and in which.

DETAILED DESCRIPTION

Figure 1:
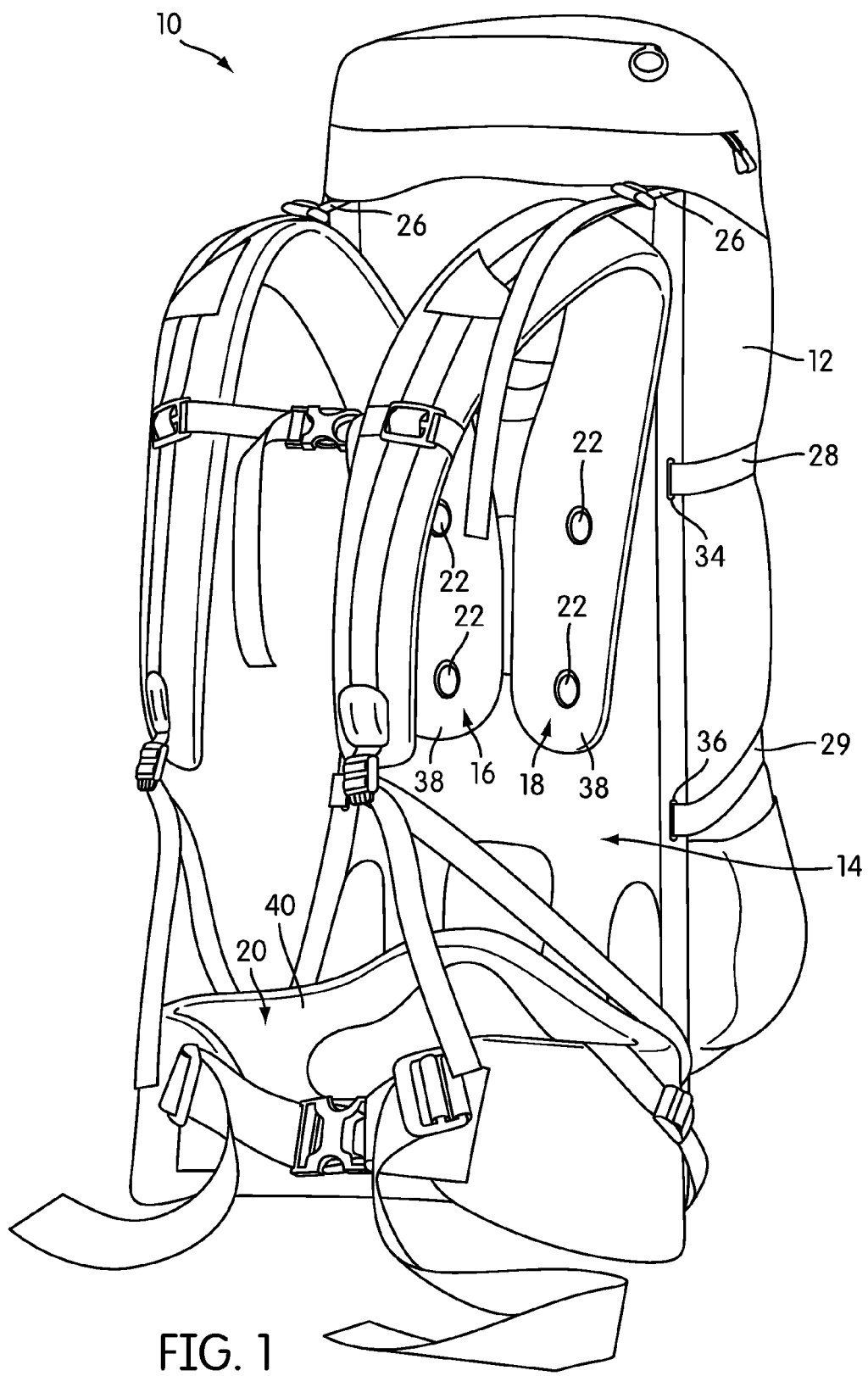
FIG. 1 is a perspective view of a backpack and frame according to one embodiment of the invention.

FIG. 1 is a rear perspective view of a backpack, generally indicated at 10, according to one embodiment of the invention. The backpack has a closeable storage volume 12 and a semi-internal frame, generally indicated at 14. As used in this description, the term "semi-internal" refers to the fact that in the illustrated embodiment, the frame 14 is at least partially exposed. However, the frame 14 need not necessarily be partially exposed in all embodiments, and may be completely internal.

The backpack 10 also includes three main load transfer points, or nodes, at which the load of the backpack 10 is transferred to the wearer of the backpack 10: two independently adjustable and positionable shoulder strap assemblies 16, 18 and a belt assembly 20. The shoulder strap assemblies 16, 18 and belt assembly 20 attach to the frame 14 using fasteners 22, 24. As will be described below in more detail, the shoulder strap assemblies 16, 18 attach to the frame 14 along respective sliding tracks, so that their vertical and horizontal positions can be independently adjusted. The fastener 24 (not shown in FIG. 1) and related structure that secure the belt assembly 20 to the frame 14 are such that the belt assembly 20 can rotate in plane about the axis defined by the fastener 24.

Figure 2:
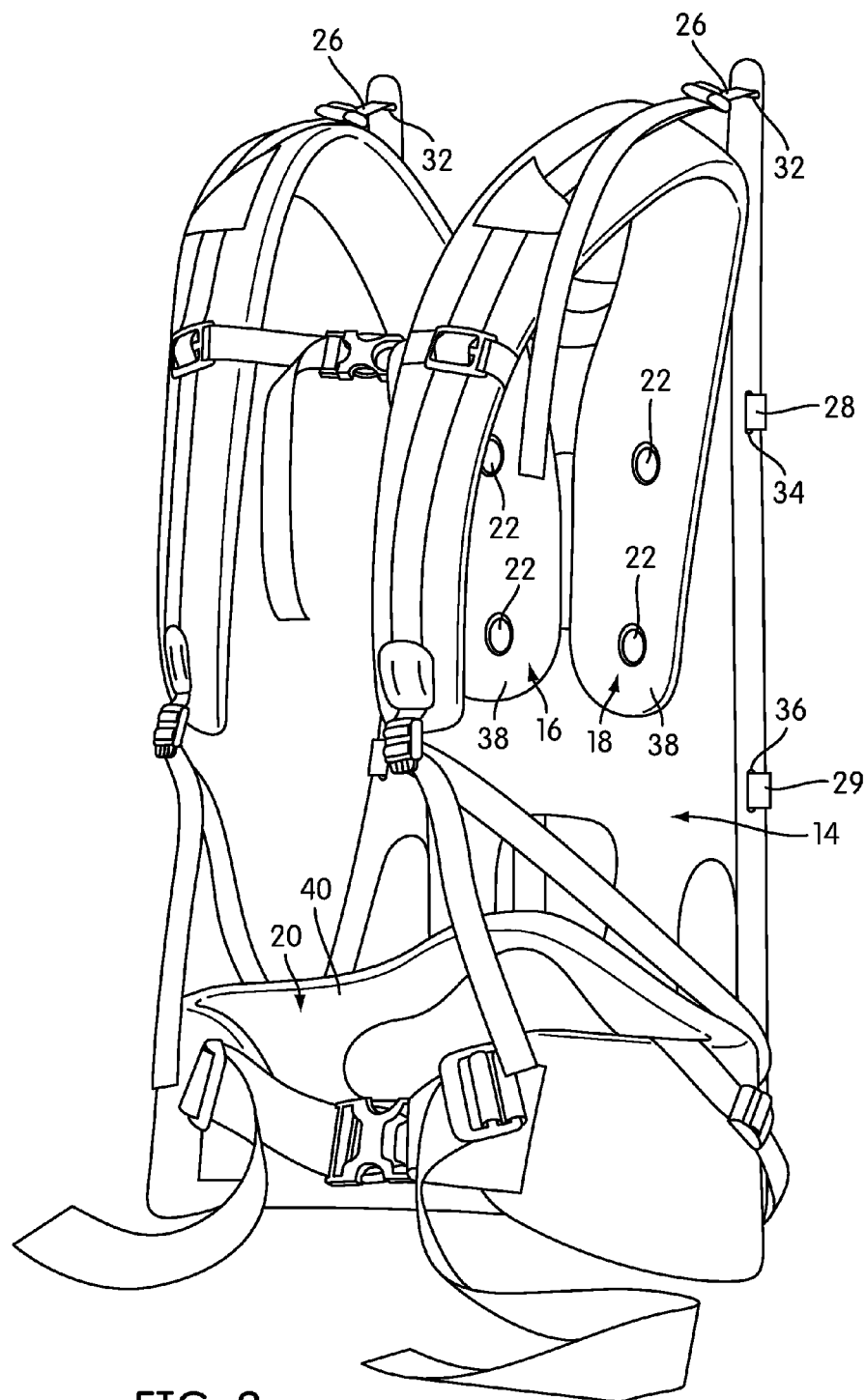
FIG. 2 is a perspective view of the backpack frame of FIG. 1 with straps and without the backpack.

FIG. 2 is a perspective view of the frame 14 with the shoulder strap assemblies 16, 18 and belt assembly 20 installed, but without the backpack 10. Straps 26, 28, 29 attached to the shoulder strap and belt assemblies 16, 18, 20 are looped through slots 32, 34, 36 in the frame 14 to connect the assemblies 16, 18, 20 to the frame 14, as will be described below in more detail. Each of the assemblies 16, 18, 20 includes a padded portion 38, 40 that is adapted to rest against the body. Straps 26, 28, typically made of webbing, such as nylon webbing, are attached to the padded portion. Length adjustment buckles and quick-release connectors are provided to fit the assemblies 16, 18, 20 to the body.

Figure 3:
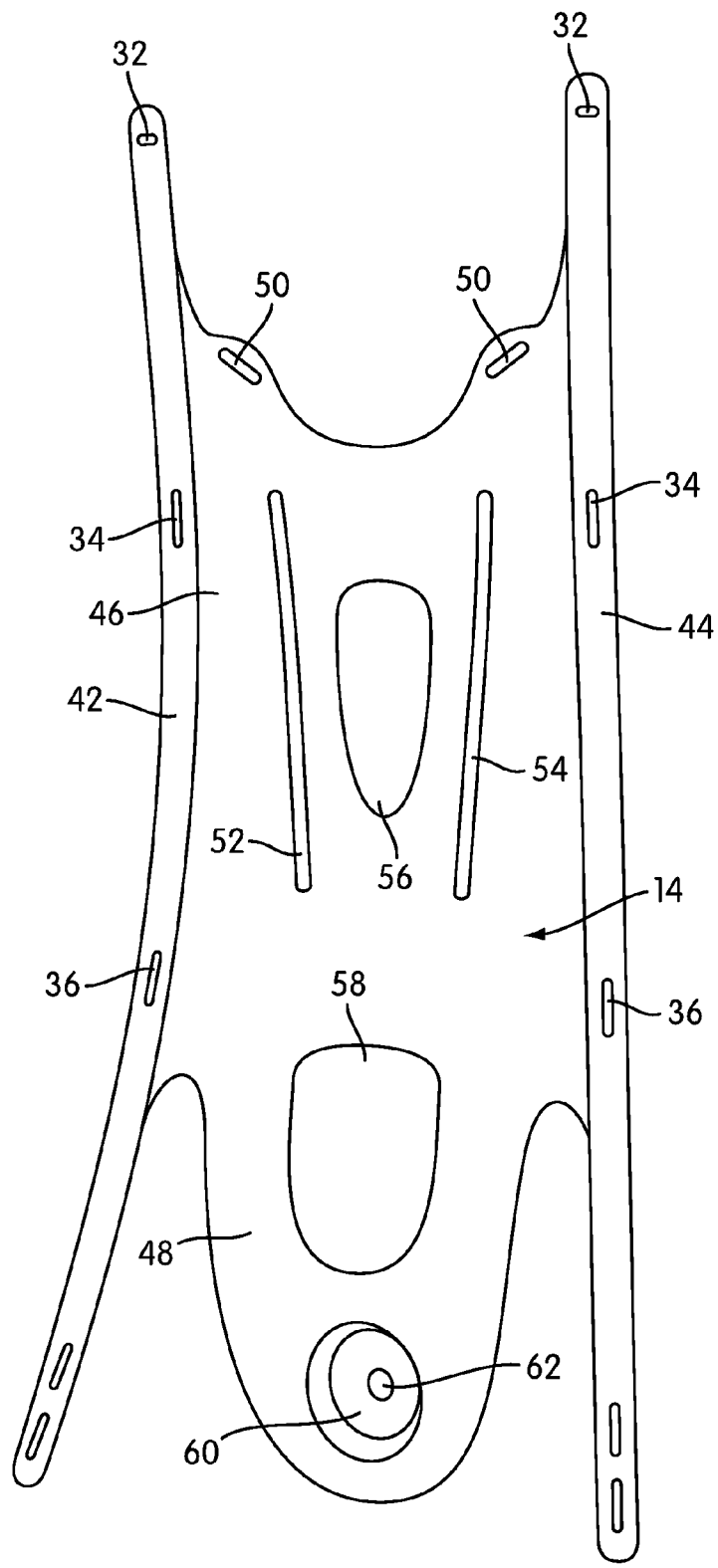
FIG. 3 is a front perspective view of the backpack frame of FIGS. 1-2 in isolation.

FIG. 3 is a front perspective view of the frame 14 in isolation. The frame 14 is most advantageously a unitary (i.e., single piece) structure that is engineered for flexibility in some places and stiffness in others. The frame 14 includes a pair of left and right stay portions 42, 44, a mid-back portion 46, and a lower portion 48, which attaches to the belt assembly 20. (In this context, the terms "left" and "right" refer only to the coordinate system of the figures.)

The left and right stay portions 42, 44 are mirror images of one another, and are the primary means by which the frame 14 connects to and suspends the load of the backpack 10. The respective top and bottom ends of the stay portions 42, 44 fit into correspondingly positioned and sized pockets in the backpack 10 (not shown in the figures). The stay portions 42, 44 provide the combination of flexibility and selective strength that suspends the load in the backpack 10 while mechanically decoupling and cushioning it from the wearer.

In general, the contours of the stay portions 42, 44 are designed to bring the load from the load transfer points, follow generally the curvature of the human back, and provide clearance where necessary so that, for example, an elbow projected rearwardly during stride will not hit the frame 14. Additionally, the static contours of the stay portions 42, 44 help to pretension the stay portions 42, 44 so that in dynamic use, with the backpack 10 loaded, they can store and release energy, increasing their ability to cushion and decouple the load from the wearer. Essentially, the stay portions 42, 44 act as resilient members or springs to suspend the load.

Figure 4:
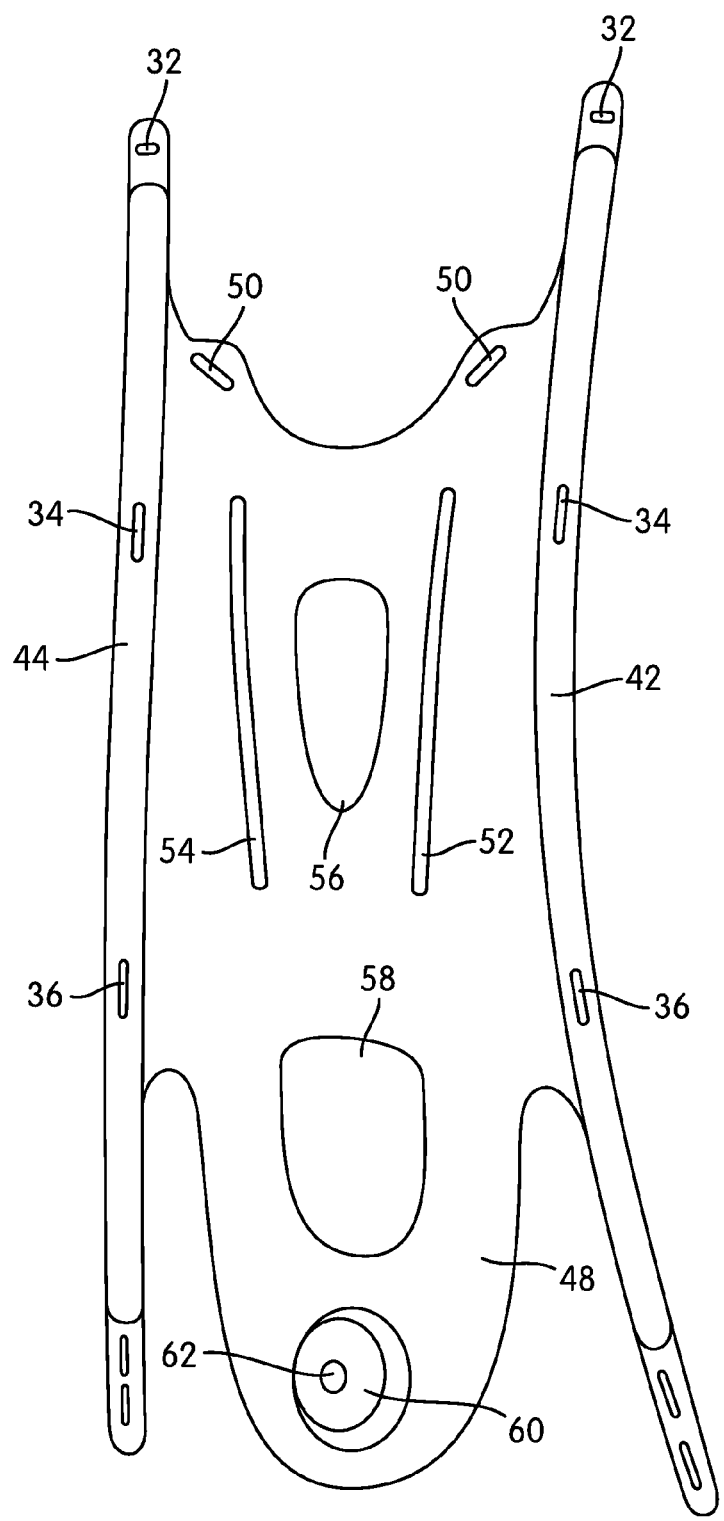
FIG. 4 is a rear perspective view of the backpack frame of FIG. 1.

As can be seen in FIG. 3, as well as in the rear perspective view of FIG. 4, the stay portions 42, 44 curve in at least two planes. Along the long axis of the frame 14, the two stay portions 42, 44 begin generally parallel to one another toward the top of the frame, extending a few inches above the mid-back portion 46. As they sweep downwardly along the long axis of the frame 14, the two stay portions 42, 44 diverge arcuately outwardly until, at their lower terminus, they are separated from the lower portion 48 by a distance and are angled away from the mid-back and lower portions 46, 48 of the frame.

Figure 5:
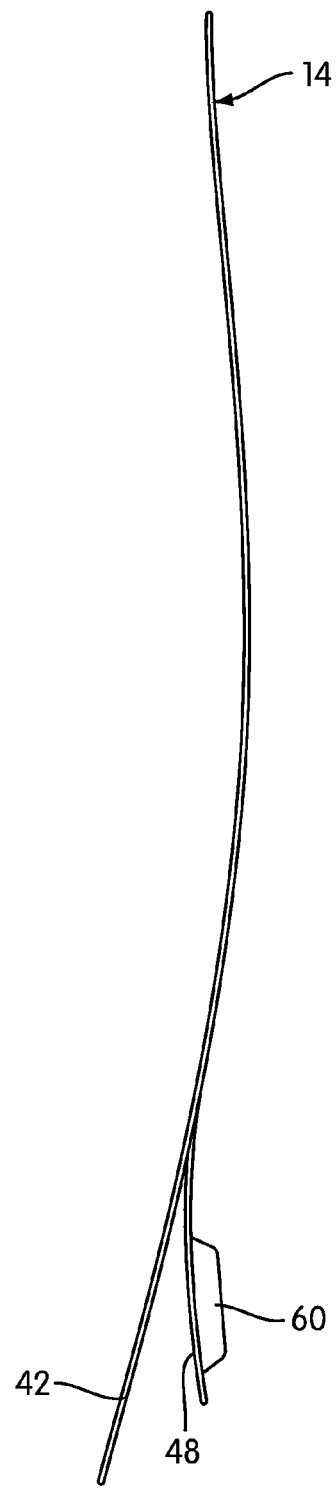
FIG. 5 is a side elevational view of the backpack frame of FIG. 1.
Figure 6:
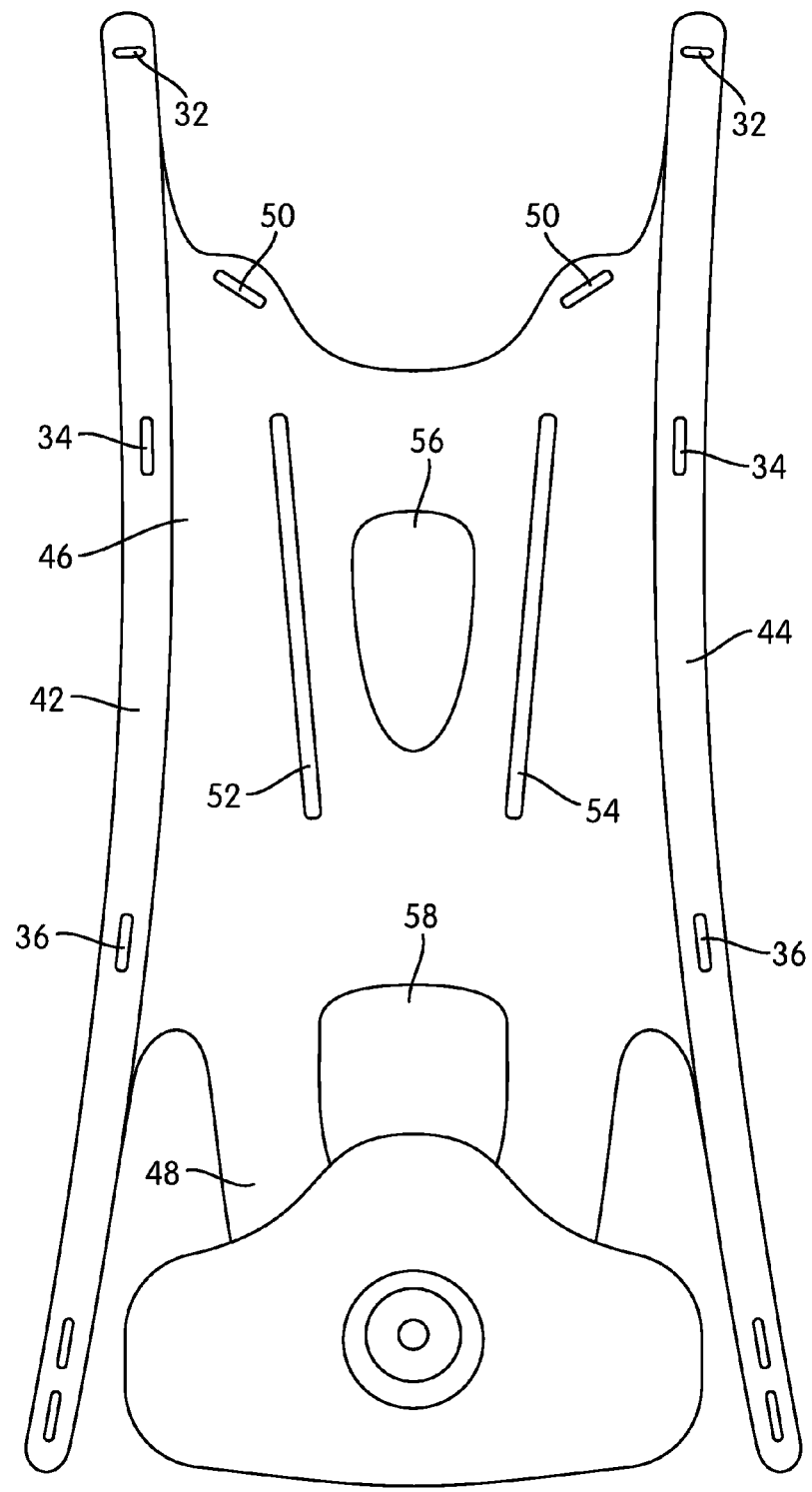
FIG. 6 is a front elevational view of the backpack frame of FIG. 1 with a hip strap attachment installed.

As shown in FIGS. 3 and 4 and in the side elevational view of FIG. 5, as the stay portions 42, 44 extend downwardly and diverge to the left and right of the frame 14, they also curve slightly rearwardly, out of the plane of the frame 14 itself. Because the stay portions 42, 44 will generally be pulled forwardly during use, the slight rearward curvature of the stay portions 42, 44 when unloaded causes them to be pretensioned while in dynamic use. Similarly, since the lower ends of the stay members 42, 44 will typically be drawn laterally inward toward the frame 14, particularly if they are attached to or near the belt assembly 20, the left and right divergent curvature of the stay portions 42, 44 causes them to be pretensioned in that plane as they are drawn inward. The top ends of the stay portions 42, 44 also serve to lift the load slightly off the shoulders and to tension the frame 14. As was described above, the respective ends of the stay portions 42, 44 are provided with horizontal and/or vertical slots 32, 34, or any other suitable kind of opening or structure, to facilitate connection and engagement with the backpack 10. The mid-back portion 46 may also be provided with attachment slots 50 along its upper edge.

The mid-back portion 46 of the frame 14 carries a pair of generally linear openings 52, 54 that serve as tracks in which the fasteners 22 can slide, so as to allow the shoulder strap assemblies 16, 18 to be independently positioned. In the illustrated embodiment, the openings that serve as tracks 52, 54 are angled slightly inwardly as they extend from top to bottom, although this need not be the case in all embodiments. Instead, the openings 52, 54 may be given any appropriate shape, including curved or arcuate, so as to provide for a range of shoulder strap assembly 16, 18 positions. Alternatively, instead of a set of continuous track-openings 52, 54, some embodiments of the frame 14 may be provided with sets or series of unconnected, discrete openings that provide discrete positions into which the shoulder strap assemblies 16, 18 may be secured.

The mid-back and lower portions 46, 48 of the frame 14 carry two large openings 56, 58. These openings 56, 58 provide ventilation and air flow, and also serve to lighten the frame 14.

The lower portion 48 of the frame 14 has the general U-shape of a tongue. A projection 60, in the form of a truncated cone, projects forwardly, out of the plane of the frame 14, is provided for attachment of the belt assembly 20, and includes its own opening 62 to facilitate the passage of fasteners and the securement of the belt assembly 20. The space 64 between the lower end of the track-openings 52, 54 and the lower of the two large openings 58 acts as a de facto hinge portion, allowing the lower portion 48 to flex somewhat relative to the mid-back portion. As can be seen in the side elevational view of FIG. 5, the mid-back and lower portions 46, 48 are generally contoured to follow the curvature of the human back.

The frame 14 may be made of a number of materials, including plastics, but is most advantageously made of composite-type, resin-impregnated materials. For example, in the illustrated embodiment, the frame 14 is made primarily of layers of resin-impregnated carbon fiber sheeting, with selective reinforcement by including interstitial materials between adjacent layers of carbon fiber so as to selectively create sandwich-type composites in areas of the frame requiring more strength or flexibility. The layers of carbon fiber may be comprised of, for example, sheets of 284 twill carbon fiber sheeting, and high wear areas, such as the area around the opening 62 in the projection 60 may include additional layers of carbon fiber sheeting. An advantage of such composite materials is that they have the capacity to dynamically store and controllably release more energy as they flex than pure plastics or metals would, which may allow them to cushion and decouple the load from the wearer more effectively than other materials.

Figure 7:
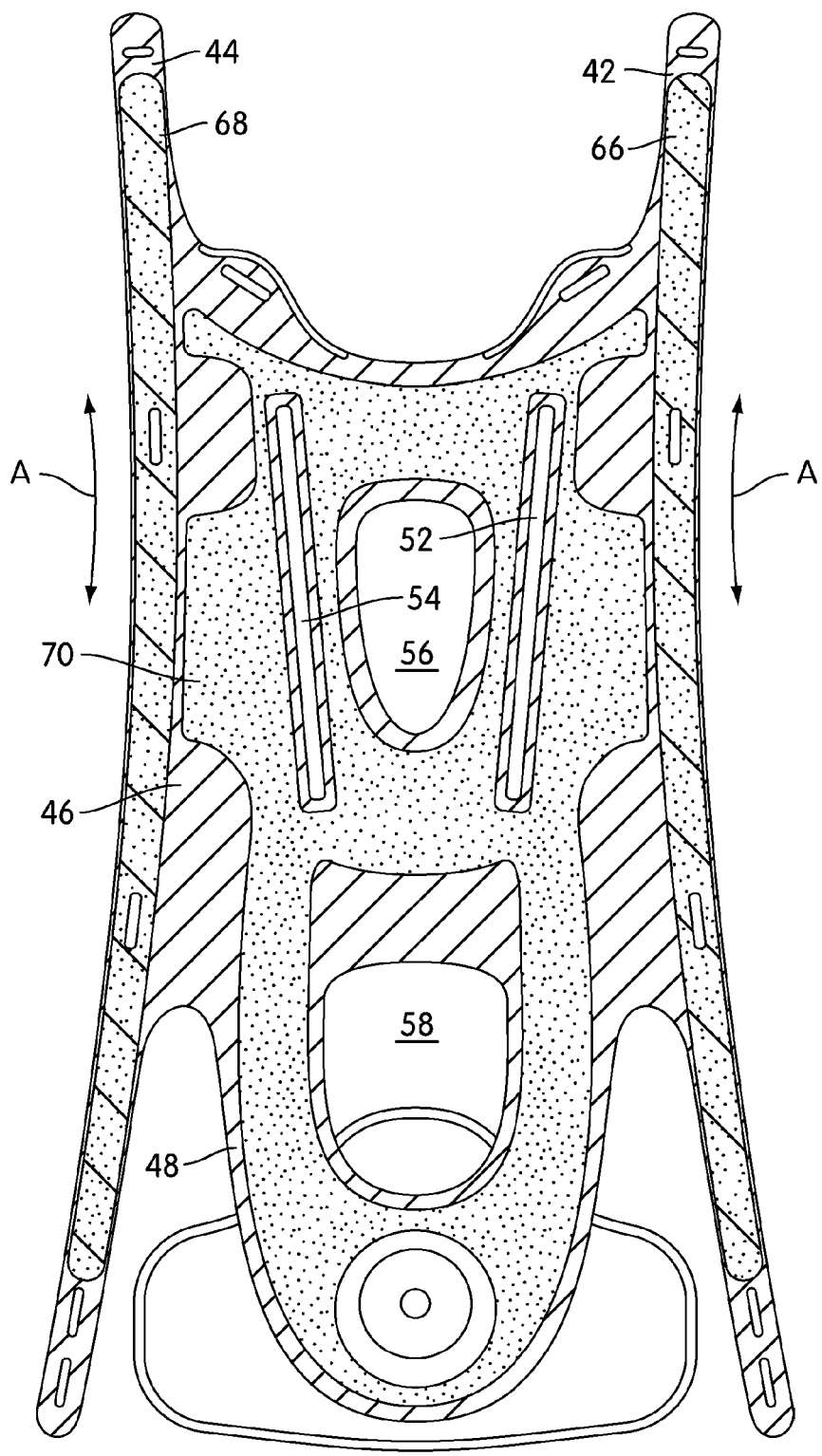
FIG. 7 is a rear elevational view of the backpack frame of FIG. 1 shaded to indicate the position and extent of reinforcing layers within the frame.

FIG. 7 is a rear elevational view of the frame 14 that is shaded to illustrate the location of reinforcements. More specifically, the stippled shading in FIG. 7 illustrates the location and extent of reinforcing material. Typically, in the illustrated embodiment, a reinforced area is reinforced with at least one layer of reinforcing material, such as FIBERGLAS®, between inner and outer layers of primary material.

The stays 42, 44 have reinforcements 66, 68 along substantially the entirety of their length, terminating just before the ends of the stays 42, 44. In some embodiments, the reinforcement may comprise sheets of woven or non-woven glass fiber (such as FIBERGLAS®). However, in the illustrated embodiment, the reinforcements 66, 68 in the stays 42, 44 comprise oriented strands of glass yarn or fiber, laid along the long axis of the stays 42, 44, as indicated by arrows A in FIG. 7. In other embodiments, the reinforcements 66, 68 in the stays 42, 44 may comprise foam, as will be described below in more detail.

In addition to the glass fiber reinforcements 66, 68 in the stays 42, 44, a broad section of the frame 14 that extends from the mid-back portion 46 into the lower-back portion 48 is reinforced by the inclusion of a foam insert 70 between two layers of carbon fiber sheeting, creating a sandwich-type composite material. The foam insert 70 covers the area around the large opening 56 and the two track-openings 52, 54 in the mid-back portion 46 and extends downwardly in a horseshoe-shape into the lower portion 48. The foam may be, for example, a PVC closed cell foam.

The frame 14 may be made by any known method of resin-impregnation. One particularly advantageous manufacturing method is resin extrusion, in which sheets of material are cut to desired shapes, laid in a mold, and resin is pumped into and drawn out of the mold. The resin used in the manufacture of the frame 14 may be any resin known in the art. For example, polyester and epoxy resins may be used in embodiments of the invention, although polyester resins may be more UV-stable over time, and may thus be preferred in some embodiments.

A completed frame 14 may be, for example, on the order of 0.375 inches thick to about 0.625 inches thick, depending on the desired stiffness and the loads that are to be carried. The frame 14 may vary somewhat in thickness across its area, with reinforced areas being thicker. The frame 14 as a whole may be thicker if greater strength and/or stiffness are required.

The size and proportions of the frame 14 will generally be dictated by anthropometric data and ergonomic considerations. Backpacks 10 and their frames 14 may be made in a variety of sizes, based on the same or different proportions.

Frames according to embodiments of the invention may also include additional features. For example, in some embodiments, a frame may include portions that extend perpendicularly outward from the mid-back or lower back portions and can be used to cinch gear to the frame.

Figure 8:
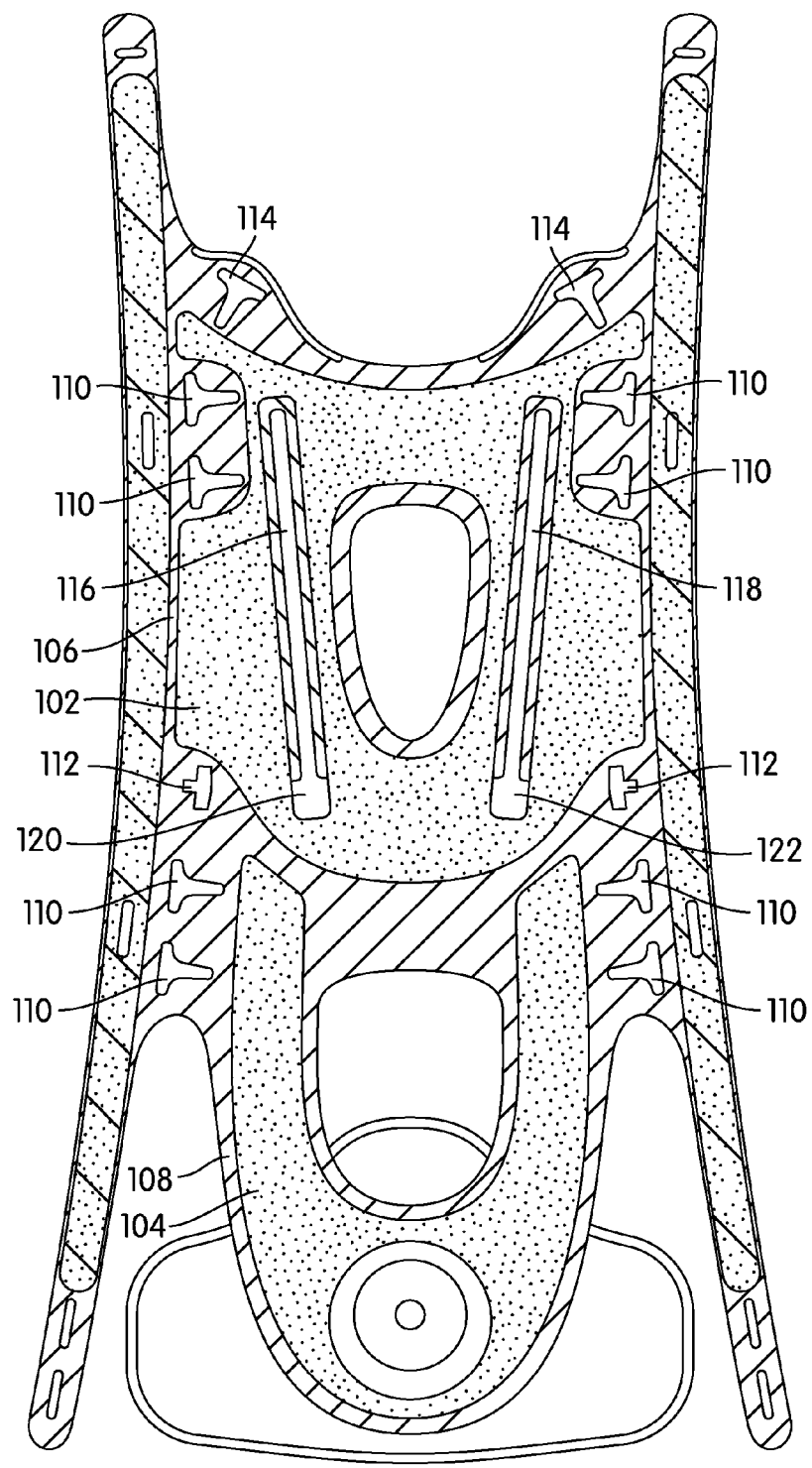
FIG. 8 is a rear elevational view of a backpack frame according to another embodiment of the invention, shaded to indicate the position and extent of reinforcing layers within the frame.

FIG. 8 is a rear elevational view of a frame 100 according to another aspect of the invention, shaded similarly to FIG. 7 to illustrate the locations of reinforcements. Frame 100 is substantially similar to frame 14, and thus, the description above will suffice for most elements. Frame 100 differs from frame 14 of FIGS. 1-7 in the location and extent of its reinforcements and in the size and shape of certain openings.

Specifically, frame 100 has separate reinforcements 102, 104 in the mid-back and lower portions 106, 108. The reinforcements 102, 104 may be of the same material or different materials, and may be the same material as used in frame 14 of FIGS. 1-7. Additionally, there are a number of T-shaped openings 110, 112, 114 which may be used to secure straps or other fittings to the frame 100. The tracks 116, 118 are also slightly different in shape, as they have lower ends 120, 122 that broaden into generally rectangular openings. Thus, as frame 100 illustrates, frames according to embodiments of the invention may have many different types, shapes, and sizes of openings.

Compression Molding Methods for Backpack Frames

As was described above, backpack frames according to embodiments of the invention may be made using a number of different techniques, including vacuum infusion of resin. However, one particularly useful molding method for backpack frames 14, 100 according to embodiments of the invention is compression molding. Generally speaking, in compression molding, fibers and reinforcements are cut to shape and laid in a mold. The laid-out pieces are coated with resin, and the coated assembly is heated for a specified time under pressure to cause the resin to impregnate and bind the layers of material together. Among other advantages, compression molding processes allow the molded article to have both front and back sides with features and dimensionality.

Figure 9:
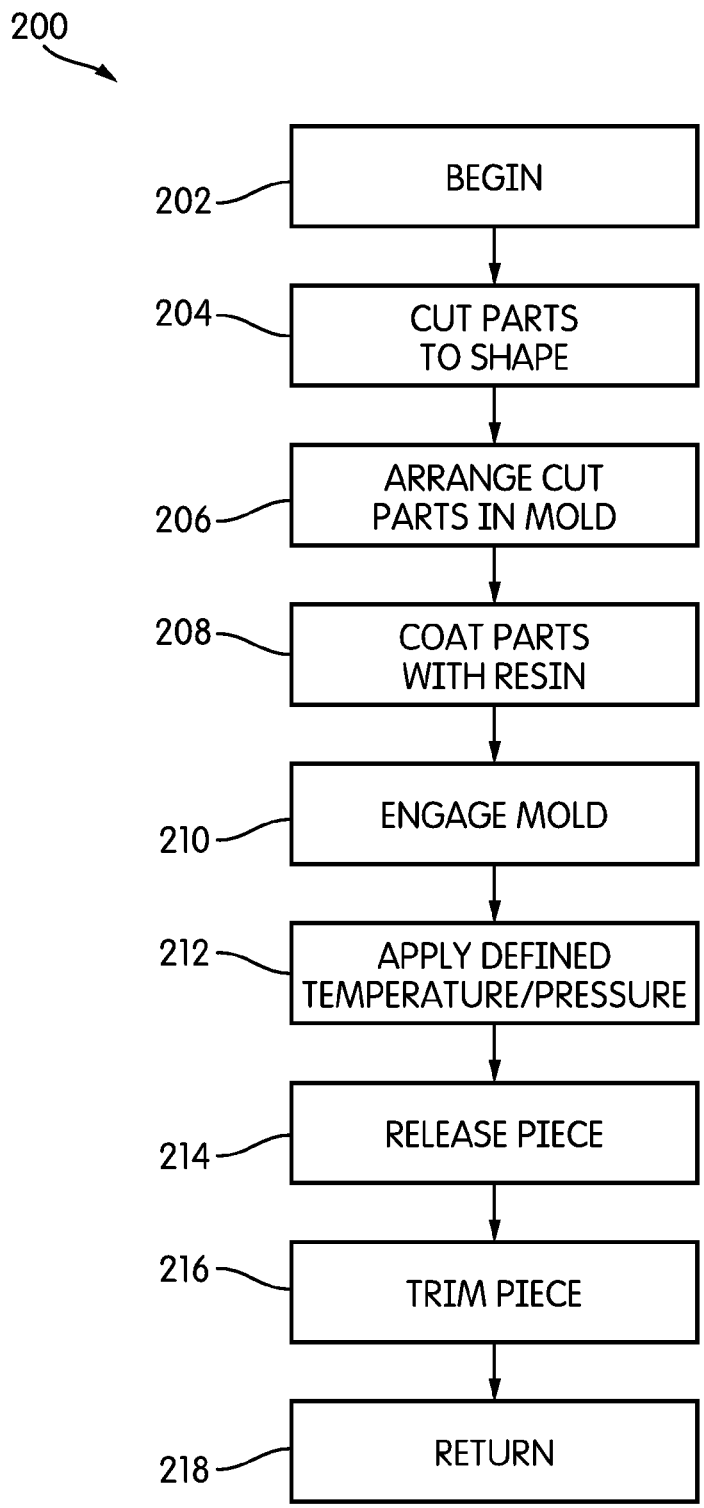
FIG. 9 is a high-level flow diagram of a method for making a backpack frame.

FIG. 9 is a high-level flow diagram of a method for compression molding a backpack frame, generally indicated at 200, according to one embodiment of the invention. The backpack frames made using method 200 may have the general shape and characteristics of the backpack frames 14, 100 described above. However, the materials used in method 200 to make backpack frames may vary from embodiment to embodiment, and the orientation, thickness, and proportions of those materials may be varied to selectively increase the strength and stiffness of the frames 14, 100 in particular areas.

Method 200 begins at task 202 and continues with task 204. The materials of which the backpack frames 14, 100 are made are typically provided in roll and sheet form. For example, carbon fiber may be provided in roll form as a woven textile, and foam or PVC reinforcements, if used, may be provided in sheet form. The carbon fiber may be, for example, in the form of a textile sheet with a 2×2 twill pattern and 12,000 carbon filaments per strand. In task 204, the layers of material are cut to their proper shapes. In some cases, the materials may be rough-cut and trimmed to their final shapes later, but the shape and profile changes of the backpack frames 14, 100 make it advantageous to cut the materials so that they are as close to their final shapes as possible early in the process. Once the materials have all been cut to shape, method 200 continues with task 206.

Figure 10:
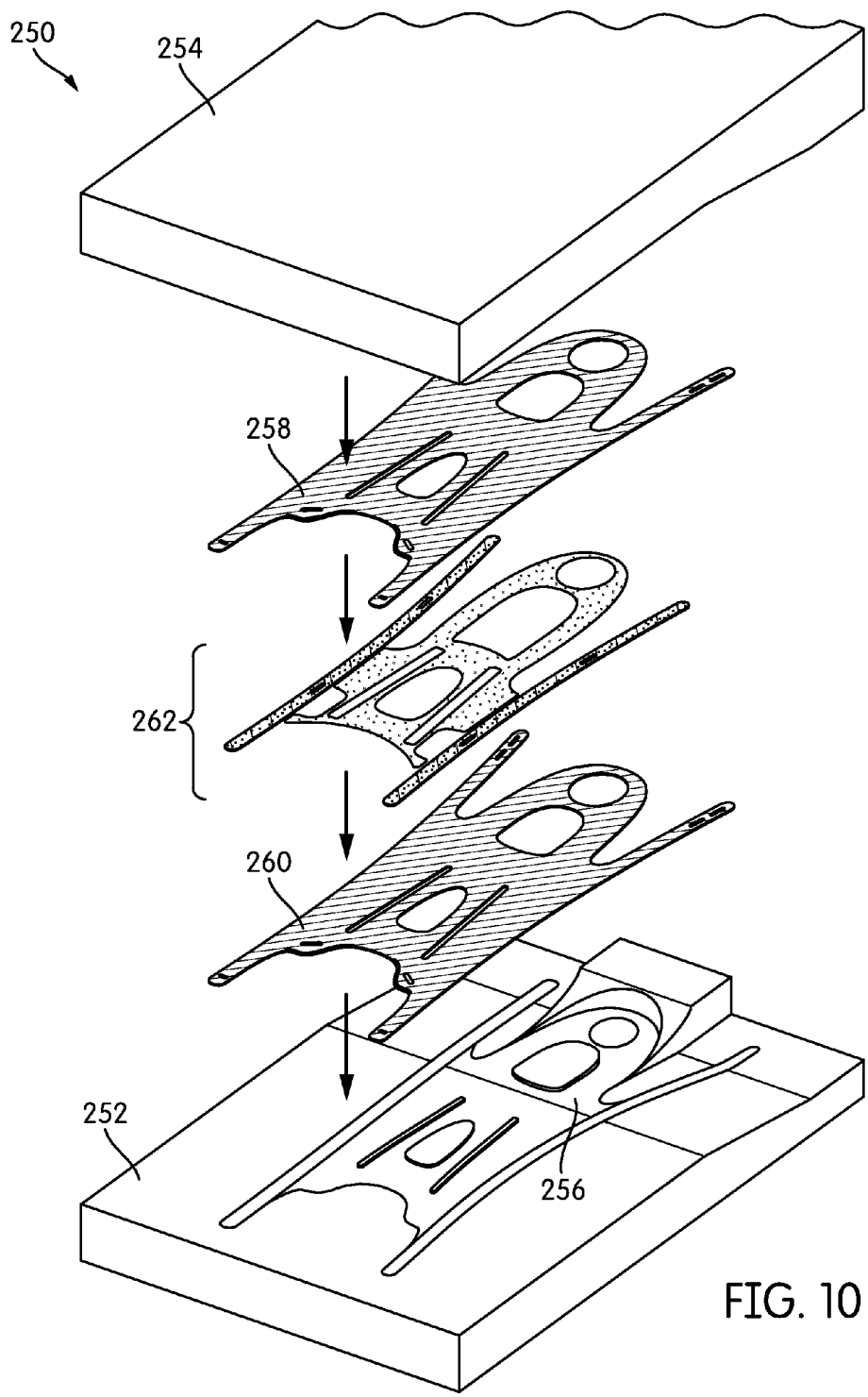
FIG. 10 is an exploded perspective view of a mold for a backpack frame, illustrating how the components are placed into the mold.

In task 206, the cut parts are arranged in a mold. FIG. 10 is an exploded perspective view illustrating a suitable mold 250, including a first mold portion 252 and a second mold portion 254. As can be seen in FIG. 10, the first mold portion 252 has a mold cavity 256 of appropriate shape and dimensions to mold one of the backpack frames 14, 100. The second mold portion 254 has a slight positive boss, not shown in FIG. 10, that matches the shape and contours of the negative mold cavity 256. The first and second mold portions 252, 254 may be made of a metal such as aluminum or steel.

Laying the cut parts in the mold, as in task 206, typically involves laying out and arranging several layers of materials. Front and back (alternatively, bottom and top) layers of carbon fiber weave 258, 260 define the two main faces of the backpack frames 14, 100. As was described above, a variety of materials may be interposed between the two layers of carbon fiber fabric as reinforcements 262. For example, in some embodiments, the stay reinforcements 66, 68 described above may comprise four layers of carbon fiber material, oriented as described above. Once the layers of material are arranged in the mold 250, method 200 continues with task 208.

In task 208, the parts are covered with resin. This may be done by brushing, rolling, spraying, or any other means known in the art. As was described briefly above, an epoxy resin may be used, although vinyl ester resins may also be suitable in some embodiments. Resins with high elongation may be useful, because they may provide more flexibility to the overall structure. As one example, the resin may be PRO-SET® laminating resin no. 145, coupled with hardener no. 229 (Pro Set Inc., Bay City, Mich., United States).

The amount of resin that is applied to the parts may vary from embodiment to embodiment; however, a final volume fraction of fiber to resin is preferably about 60% fiber to 30% resin. Functional backpack frames 14, 100 may be achieved with different volume fractions—for example, a backpack frame 14, 100 may be made that comprises about 70% resin to about 30% fiber. However, backpack frames 14, 100 with more resin than fiber may need to be heavier and thicker to achieve the same strength.

Once the parts are coated in task 208, method 200 continues with task 210, in which the two portions 252, 254 of the mold 250 are engaged. Although not shown in FIG. 10, the two mold portions 252, 254 are usually engaged together while resting in a load frame, and a hydraulic cylinder, screw-driven mechanism, or other type of pressure-applying device is used to apply pressure to one or both of the mold portions 252, 254. Method 200 continues with task 212.

In task 212, once the mold 250 is engaged, a predefined level of pressure and a predefined temperature are applied for a predefined time. The pressure is generally constant throughout the predefined time, while the temperature may be either constant or defined by a function (i.e., the temperature may be ramped up and down in a predefined way). The temperatures, pressures, time durations, and, if used, ramping functions may vary widely, depending on the nature of the resin that is used, the desired appearance of the final product, and other factors that are known in the art. For example, in general, the present inventors have found that the less pressure that is used, the better the aesthetic appearance of the finished backpack frame 14, 100, while greater pressures lead to lighter parts as some of the resin is squeezed out during the process. For that reason, pressures as low as about 5 tons (4.5 metric tons) may be suitable for some embodiments, 10-12 tons (9-11 metric tons) may be used in other embodiments, and pressures as high as the mold portions 252, 254 themselves can tolerate may be used in yet other embodiments (e.g., 20-30 tons).

Similarly, with respect to temperature, any temperature that will cure the resin within a reasonable time frame may be used in method 200. Temperatures in the range of about 100° F. (about 38° C.) to about 200° F. (about 93° C.) may all be suitable in different embodiments, with 150° F. (about 65° C.), and 180° F. (about 82° C.) being common maximum temperatures. Of course, if ramps are used, the mean temperature to which the parts are exposed may be about 125° F. (about 52° C.) or 140° F. (about 60° C.) in those cases. The precise temperature that is used in any implementation of method 200 will depend on the resin that is being used, the pressure, the time, and on other factors known in the art.

As one example, task 212 may involve applying about 11 tons of pressure (10 metric tons) for a period of about two hours while the temperature is ramped from 100° F. to 150° F. (taking about 1 hour) and back down to 100° F. (taking about 1 hour), with only a few minutes of loiter time at the maximum temperature. In a production situation, the cool-down period may be shortened, so that a 45-minute ramp-down/cool-down is used before the next set of materials is inserted and method 200 is repeated. A shortened ramp-up of about 45 minutes may also be used. Ultimately, the goal of task 212 of method 200 is to bind the materials 258, 260, 262 into a unitary structure with composite mechanical properties. Any conditions that achieve that goal may be used in task 212.

Heating blankets, resistive heating elements in the mold portions 252, 254, a heated chamber, or other known heating means may be used to heat the mold 250, and those heating elements may be controlled by a standard process controller. Once task 212 is complete, method 200 continues with task 214, and the molded piece is removed from the mold 250.

As shown by task 216 of method 200, in some cases, the molded piece may be trimmed, if necessary, to its final shape before method 200 completes and returns at task 218.

Additional Frame Embodiments

The frames 14, 100 described above include both upper and lower stay portions on a unitary frame. Of course, different backpacks may require different types of frames, and different types of frames may be made according to embodiments of the invention.

Figure 11:
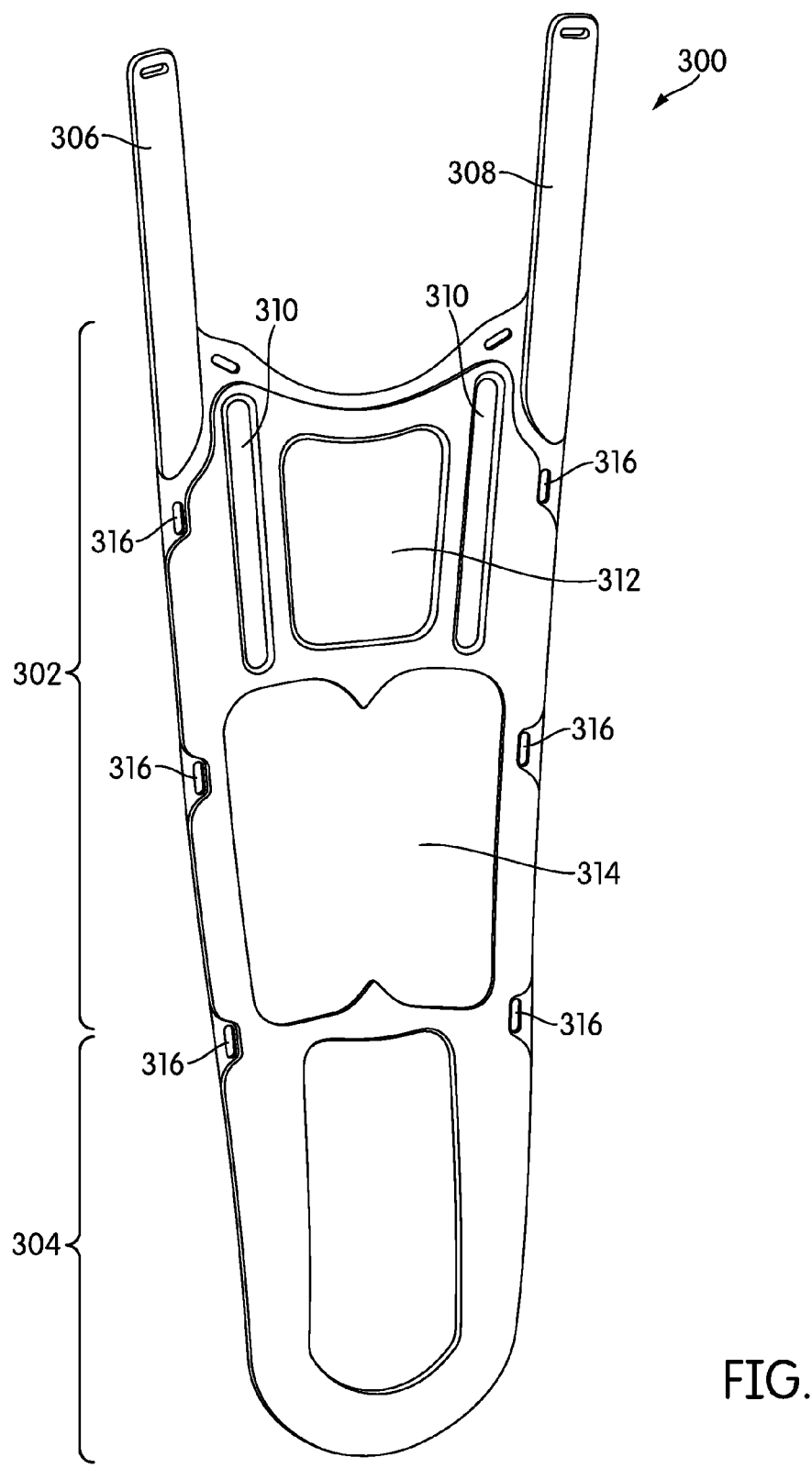
FIG. 11 is a perspective view of a backpack frame according to another embodiment of the invention.

FIG. 11 is a perspective view of a frame, generally indicated at 300, according to another embodiment of the invention. Like the frames 14, 100 described above, frame 300 is a unitary frame made of a sandwich composite material. For example, frame 300 may be made using two layers of a 3 k 2×2 twill carbon fiber with 1/16 inch core material. It may be made using the compression molding methods, like method 200, that are described above, although in other embodiments, other techniques, like vacuum impregnation may be used. When formed, frame 300 may have a thickness of about 0.12 to 0.15 inches.

As can be seen in FIG. 11, frame 300 is symmetrical about its long axis and includes an upper portion 302 that tapers into a lower portion 304, such that the top of the frame is wider than its bottom. Left and right stay upper portions 306, 308 extend from the top portion 302.

Compared with the frames 14, 100 described above, frame 300 differs in that it includes only upper stay portions 306, 308; there are no lower stay portions. In many cases, upper stay portions 306, 308 alone may be enough to suspend the load of a backpack and to decouple the load from the body. While frame 300 may be used with any type of backpack, its shape may be particularly useful with smaller, lighter day packs. The two upper stay portions 306, 308 diverge outwardly from the centerline of the frame. In one embodiment, there may be about a 10° angle between the two stays 306, 308.

Like the frames 14, 100 described above, the upper portion 302 includes two open sliding tracks 310 where shoulder strap assemblies may be attached. A central opening 312 between the two tracks 310 lightens the frame 300. Below the tracks 310 and the central opening 312, an unreinforced area 314 provides for greater flexibility. The lower portion 304 is open and U-shaped, much like the lower portions of the other frames 14, 100. On its top, sides, and on the tops of the stay portions 306, 308, frame 300 includes a number of openings 316 that permit attachment to a backpack or attachment of accessories.

Figure 12:
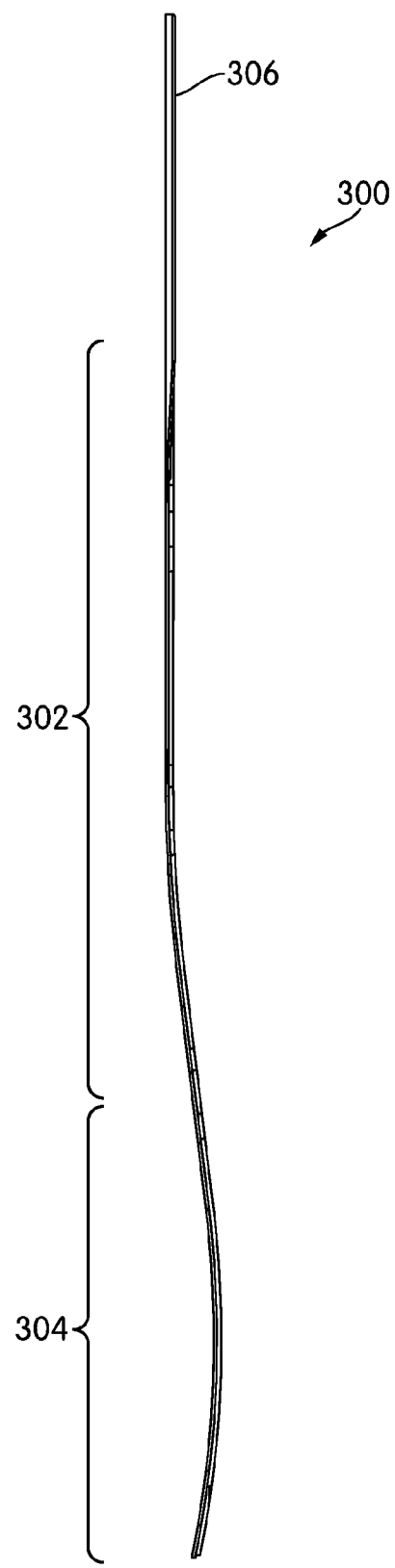
FIG. 12 is a side elevational view of the backpack frame of FIG. 11.

FIG. 12 is a side elevational view of the frame 300 of FIG. 11. As can be seen in FIG. 12, the lower portion 304 is curved to match the lumbar-sacral curve of the back. The top portion 302 is more linear than in other embodiments 14, 100. As with the other embodiments 14, 100, the stay portions 306, 308 diverge slightly rearwardly.

Overall, in one embodiment, the frame 300 may have a length of approximately 24.5 inches overall, with a width at the bottom of approximately 5 inches and a width at the top, between the centers of the stay portions 306, 308 of approximately 8.25 inches. The stay portions 306, 308 may extend approximately 7.5 inches.

A backpack may be coupled to the frame 300 in essentially the same way that the backpack 10 is coupled to its frame 14. However, as those of skill in the art will note, the frame 300 does not include structure to attach a rotatable waist belt assembly, as do the frames 14, 100 described above. If desired, though, a non-rotatable waist belt assembly could be attached using the openings 316 on the sides of the frame 300.

While the invention has been described with respect to certain embodiments, the description is intended to be illuminating, rather than limiting. Modifications and changes may be made within the scope of the invention, which is defined by the appended claims.

What is claimed is:

1. A backpack frame, comprising:
a unitary, contiguous, resin-impregnated sandwich structure comprising first and second layers of fiber material with a core material selectively interposed between defining
an upper portion having
right and left elongate stay portions extending upwardly from respective right and left upper edges thereof, and a central opening, and
right and left open tracks positioned on either side of the central opening upper portion, the tracks being adapted to attach directly to respective left and right shoulder straps, such that the shoulder straps are positionable along the tracks; and
a lower portion curved to follow the lumbar-sacral curvature of a human back, the lower portion terminating in a generally U-shaped tongue, such that the bottom of the U-shaped tongue is the bottom of the backpack frame, the U-shaped tongue being adapted to attach directly to a waist belt and having an opening that is contoured to the tongue;
wherein the backpack frame is symmetrical about a long axis thereof and tapers continuously down in width from the upper portion toward the lower portion.

2. The backpack frame of claim 1, wherein the upper portion includes an unreinforced portion.

3. The backpack frame of claim 1, wherein the backpack frame includes series of openings on respective left and right sides thereof.

4. The backpack frame of claim 1, wherein the first and second layers of fiber material comprise layers of woven carbon fiber material.

5. The backpack frame of claim 4, wherein the layers of woven carbon fiber material comprise 3 k 2×2 twill woven carbon fiber.

6. A backpack frame, comprising:
a unitary, contiguous, resin-impregnated sandwich structure comprising first and second layers of fiber material with a core material selectively interposed between defining
an upper portion having
right and left elongate stay portions extending upwardly from respective right and left upper edges thereof, and
left and right generally vertically oriented open tracks, the tracks being adapted to attach directly to respective left and right shoulder straps, such that the shoulder straps are positionable along the tracks; and
a lower portion curved to follow the lumbar-sacral curvature of a human back, the lower portion terminating in a depending, generally U-shaped tongue, such that the bottom of the U-shaped tongue is the bottom of the backpack frame and a width of the U-shaped tongue
(1) is consistently less than a width of the upper portion throughout the entire length of the U-shaped tongue, and
(2) comprises the entire width of the backpack frame at the U-shaped tongue,
the U-shaped tongue
(1) having an opening that is contoured to the tongue, and
(2) being adapted to attach directly to a waist belt;
wherein the backpack frame is symmetrical about a long axis thereof.

7. The backpack frame of claim 6, wherein the upper portion further comprises a central opening positioned between the left and right tracks.

8. The backpack frame of claim 7, further comprising a portion without the core material positioned between the tracks and opening and the lower portion of the frame.

9. The backpack frame of claim 6, further comprising respective series of openings along left and right sides of the backpack frame.

10. The backpack frame of claim 6, wherein the backpack frame tapers down in width from the upper portion toward the lower portion.

11. The backpack frame of claim 6, wherein the first and second layers of fiber material comprise layers of woven carbon fiber material.

12. The backpack frame of claim 11, wherein the layers of woven carbon fiber material comprise 3 k 2×2 twill woven carbon fiber.

13. A backpack frame, comprising:
a unitary, contiguous, resin-impregnated sandwich structure comprising at least first and second layers of woven fiber material with a core material selectively interposed between, defining
an upper portion having
right and left elongate stay portions extending upwardly from respective right and left upper edges thereof, the left and right stay portions diverging outwardly from the long-axis centerline of the backpack frame, and
right and left open tracks positioned on either side of the upper portion opposite one another, the tracks being adapted to attach directly to respective left and right shoulder straps, such that the shoulder straps are positionable along the tracks; and
a lower portion curved to follow the lumbar-sacral curvature of a human back, the lower portion terminating in an open, generally U-shaped tongue, such that the bottom of the U-shaped tongue is the bottom of the backpack frame and a width of the U-shaped tongue
(1) is consistently less than a width of the upper portion throughout the entire length of the U-shaped tongue, and
(2) comprises the entire width of the backpack frame at the U-shaped tongue,
the U-shaped tongue
(1) having an opening that is contoured to the tongue, and
(2) being adapted to attach directly to a waist belt;
wherein the backpack frame is symmetrical about the centerline.

14. The backpack frame of claim 13, wherein the woven fiber material comprises woven carbon fiber material.

15. The backpack frame of claim 13, wherein the left and right stay portions diverge outwardly at an angle of about 10°.

16. The backpack frame of claim 13, wherein the backpack frame tapers continuously from the upper portion toward the lower portion.

17. The backpack frame of claim 13, further comprising a plurality of openings disposed at intervals on respective left and right sides of the frame.

18. The backpack frame of claim 13, further comprising a central opening in the upper portion of the frame.

* * * * *